April 15, 1941.  J. W. BIEREK  2,238,549
SAUSAGE COOKER
Filed Oct. 10, 1939
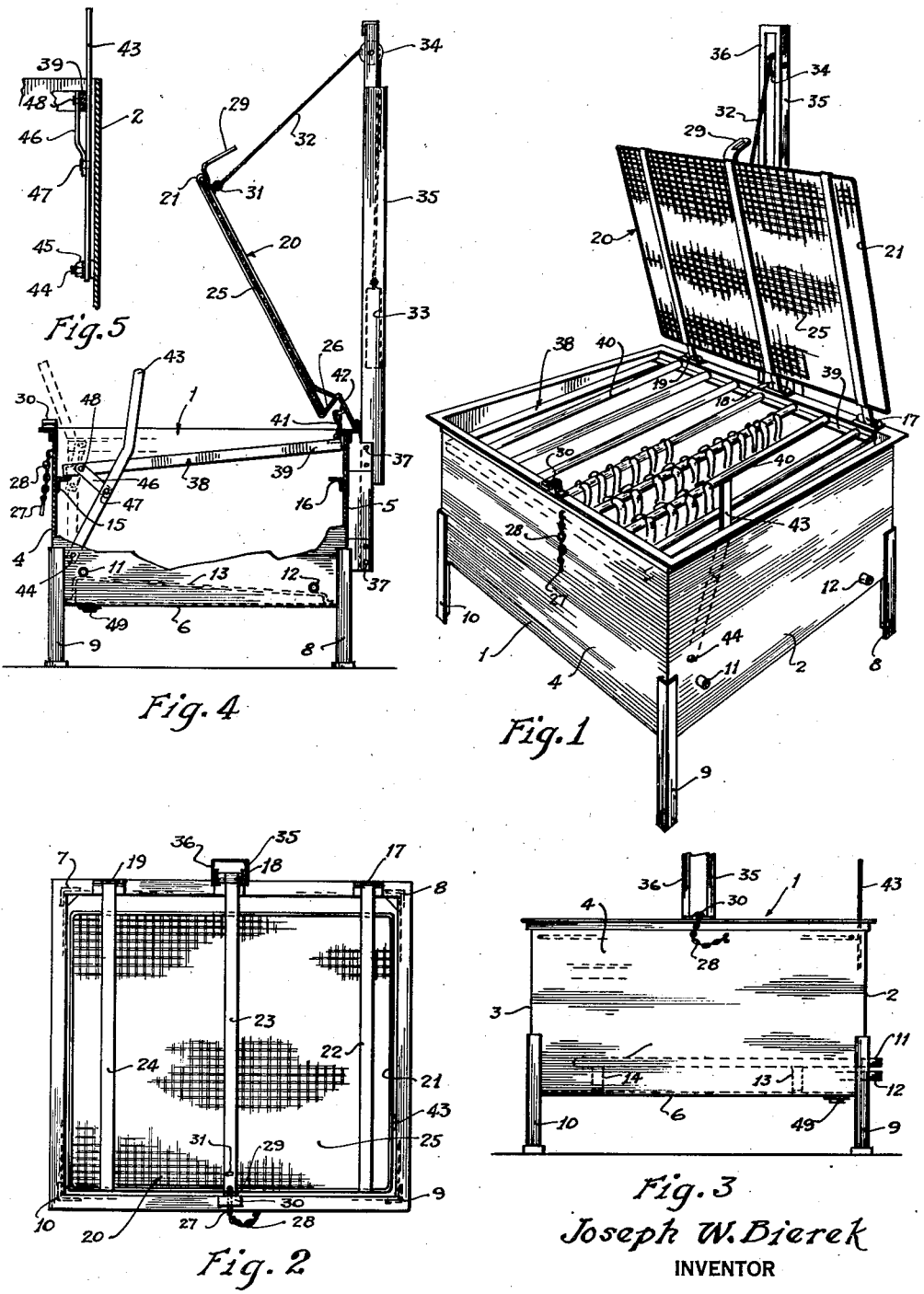
Joseph W. Bierek
INVENTOR
ATTORNEY Patented Apr. 15, 1941

2,238,549

UNITED STATES PATENT OFFICE 2,238,549

SAUSAGE COOKER

Joseph William Bierek, Seattle, Wash., assignor to Industrial Patents Corporation, Chicago, Ill., a corporation of Delaware Application October 10, 1939, Serial No. 298,821

7 Claims. (Cl. 53—1)

This invention relates to a sausage cooking device.

One of the objects of the invention is to provide a hot water sausage cooker with readily removable bars for supporting the sausage.

Another object of the invention is to provide a cooker with a rack which may be readily raised or lowered at the option of the operator.

Other objects of the invention will be apparent from the description and claims which follow.

Designations of position such as the terms "front" and "rear" as used in this specification will be understood to denote portions of the respective parts as they appear in the completed device.

In the accompanying drawing which forms a part of this specification, similar reference characters in the several figures designate similar parts.

Figure 1 is a perspective view of one embodiment of the present invention with the cover in the open position and showing frankfurters in place for cooking.

Figure 2 is a plan view of Figure 1.

Figure 3 is a front elevation of Figure 1.

Figure 4 is an end view of one embodiment of the present invention partially in section.

Figure 5 is a detailed drawing of the pivot means for raising one side of the sausage rack.

The present device comprises a watertight vessel 1 consisting of end walls 2 and 3, front side wall 4, rear side wall 5, and bottom 6 in which is located drain 49. The vessel may be supported by any suitable means, as by legs such as 7, 8, 9, and 10. Steam coils 11 and 12 rest upon supports 13 and 14 affixed to the bottom 6. Affixed to the front and rear side walls are brackets 15 and 16, which may be made of angle iron attached to the walls by any suitable means, located to support the sausage rack and bars beneath the water level when the vessel is filled for cooking. Attached to the rear side wall 4 of the vessel as by means of hinges 17, 18, and 19, is a screen cover 20 comprising, in the embodiment shown, frame 21, cross arms 22, 23, and 24 and screen 25. In the preferred embodiment of the invention, the screen cover fits within the vessel 1, which result is secured by set-off 26 in the cross arms 17, 18, and 19. The cover 20 may be locked in a closed position by any suitable means as by pin 27, which may be chained to the front wall 4 of the vessel by chain 28, adapted to be placed within latch 29 on the top of the cover 20 and eye 30 on the top of the front wall 4 of the vessel 1. Affixed to the front edge of the cover 20 by a suitable eye 31 is cord 32 attached to counterweight 33, and operable over pulley 34 affixed to risers 35 and 36 securely attached to the rear wall 5 of the cooker 1, as by bolts 37.

Operable within the cooking vessel 1 is raisable rack 38 comprising frame 39 and removable sausage sticks 40, over which may be placed the sausage or other material to be cooked. The rear side edge of the rack frame 39 is linked to cover 20 by means of a short length of chain 41 affixed to the cover by any suitable means such as staple 42 a short distance from the hinge 18. The front edge of the rack frame 39 can be raised or lowered by means of the lever 43, movably affixed to end wall 2 of vessel 1 by any suitable means, such as by stud 44 welded to the inside of the end wall 2 and nut 45 thereon. Lever 43 is connected to the front edge of rack frame 39 by means of link 46 attached to the lever arm 43 by means of pin 47 and to the rack by means of pin 48.

In the operation of the present invention, material to be cooked, such as frankfurters, is placed upon removable sausage sticks 40 in any suitable arrangement when the rack is in the raised position. Then the front side of the rack is lowered into the water by the movement of lever arm 43 to the lowered position and the rear side of the rack lowered by merely closing the cover 20 and locking in the closed position.

The product can be cooked any desired period of time and after cooking is completed, the cover 20 is raised, thereby raising the rear side of the cooking rack 38 out of the water. The front side of the cooking rack can then be raised by movement of the lever arm 43 to the raised position.

It will readily be seen that the advantages of such an arrangement are many. It simplifies the loading of the cooking vessel, both in the time taken to load the cooker and in the labor necessary therefor. The bars on which the product is placed are raised out of the water for the loading and unloading operations, thereby securing ease in handling and safety from scalds or burns which otherwise might occur. If the removable sausage sticks 40 are removable from rack frame 39, the bars can be loaded away from the cooker, and easily, quickly and safely placed on the rack frame, while the frame is in the raised position.

The present invention also has the advantage of assuring a uniform cooking as sausage is not in contact with other products during the cooking process.

I claim:

1. A cooker comprising a vessel having a raisable cover, a rack frame, removable bars to fit across said rack frame, means for raising and lowering a portion of said rack frame in unison with said cover, and independent means for raising and lowering the other portion of said rack frame.

2. A cooker comprising a vessel, a hinged screen cover operable to fold within the top of said vessel, a rack linked to and below said cover adjacent to the hinged side of said cover, and lever means for raising and lowering the opposite side of said rack.

3. A sausage cooker comprising a vessel, a hinged cover, a raisable rack linked to said cover, said cover when folded in an open position serving to raise one edge of said rack, and a lever means serving to raise or lower the opposite edge of said rack.

4. A cooker comprising a vessel, a hinged cover, a raisable rack, means for sustaining said rack in a lowered position and means for raising said rack adjacent to the top of the vessel, said means comprising a linkage to the hinged cover a short distance away from the hinge, and a lever serving to raise or lower the opposite side edge of said rack.

5. A cooker comprising a vessel, a hinged cover operable to fold within the top of said vessel, a rack linked at one of the sides of said vessel to and below said cover, and a lever means, said cover when folded in an open position serving to raise said rack at one of its side edges relative to said vessel, and said lever means serving to raise or lower the opposite side edge of said rack relative to said vessel.

6. A cooker comprising a vessel, a hinged cover and a raisable rack, means for raising one side of said rack by the raising of said cover, and an independent means for raising the opposite side of said rack.

7. A cooker comprising a vessel, a hinged screen cover and a raisable rack, the side of said rack adjacent to the hinges at the side of said cover being linked to said cover whereby that side of said rack is raised and lowered by the opening and closing of said cover, and independent lever means linked to the opposite side of said rack whereby such side may be raised and lowered independently of the first side of said rack.

JOSEPH WILLIAM BIEREK.